May 31, 1955  S. C. OSBORNE  2,709,522
CONTAINER FOR ANTI-SCALING SUBSTANCE
Filed Nov. 15, 1951

INVENTOR.
Samuel C. Osborne
BY Herman Seid
Atty.

United States Patent Office 2,709,522
Patented May 31, 1955

2,709,522

CONTAINER FOR ANTI-SCALING SUBSTANCE

Samuel C. Osborne, Syracuse, N. Y., assignor to Carrier Corporation, Syracuse, N. Y., a corporation of Delaware Application November 15, 1951, Serial No. 256,569

3 Claims. (Cl. 210—36)

This invention relates to a container for adding anti-scaling substance to water employed in an evaporative cooler and, more particularly, to a container for holding a supply of anti-scaling substance in contact with water, the supply of anti-scaling substance being automatically renewed as the substance is dissolved by the water.

A problem exists in connection with the use of evaporative condensers in refrigerating systems. As is well known, water from the sump of an evaporative condenser is sprayed over the coil therein in heat exchange relation with refrigerant in the coil and air being drawn through the casing of the condenser by the fan. Since, in many instances, calcium and magnesium salts are present in the water, contact of the water with the hot coil causes these salts to precipitate, adhering to the tubes causing scale formation thereon.

Excessive scale formation over a period of time prevents satisfactory heat exchange between the refrigerant in the coil and the water and air exterior of the coil. It has been suggested that this problem of scale formation may be eliminated by bleeding water from the sump of the evaporative condenser. It has been found, however, that reliance solely on such procedure is undesirable for the volume of water wasted is so great as to increase vastly the cost of operation. It has been suggested that some anti-scaling substance be added to the water. Since such substances are expensive, it is necessary that the quantity of anti-scaling substance added to the water be no greater than is required. In connection with the use of an anti-scaling substance, it has been found that frequently the operator of the refrigeration system fails to renew the supply thereof when necessary so that scaling occurs.

The chief object of the present invention is to provide a container for a dry chemical substance for addition to a liquid which is adjustable to regulate the rate of feed in accordance with the size of the installation on which it is employed.

An object of the present invention is to provide a container for a dry chemical substance for addition to a liquid which is adjustable to provide a predetermined rate of supply of the substance to the liquid thereby permitting a standardized container to be employed for a variety of conditions.

A further object is to provide a container for an anti-scaling substance so designed that the supply of anti-scaling substance in contact with water is automatically renewed as the substance is dissolved by the water.

A still further object of the present invention is to provide a simple, economical container for an anti-scaling substance which eliminates in large part the problem of scale formation involved in the use of an evaporative condenser.

A still further object is to provide a container for anti-scaling substance in which the level of water therein may be adjusted as desired when the container is installed for use with an evaporative condenser thereby assuring a supply of substance in the container which may be employed to renew automatically the supply of substance in contact with water in the container. Other objects of my invention may be readily perceived from the following description.

This invention relates to a container adapted to permit the addition of a dry matter to a liquid which comprises in combination a casing having an inlet and an outlet and providing a path therethrough for flow of liquid from the inlet to the outlet, means to place a desired supply of dry matter in the path of liquid flowing through the casing and means to provide a predetermined continuous rate of feed of liquid through said path, said first means serving to renew automatically the supply of matter in said path as the matter is dissolved by passage of liquid through the casing.

The attached drawing illustrates a preferred embodiment of my invention, in which.

Figure 1:
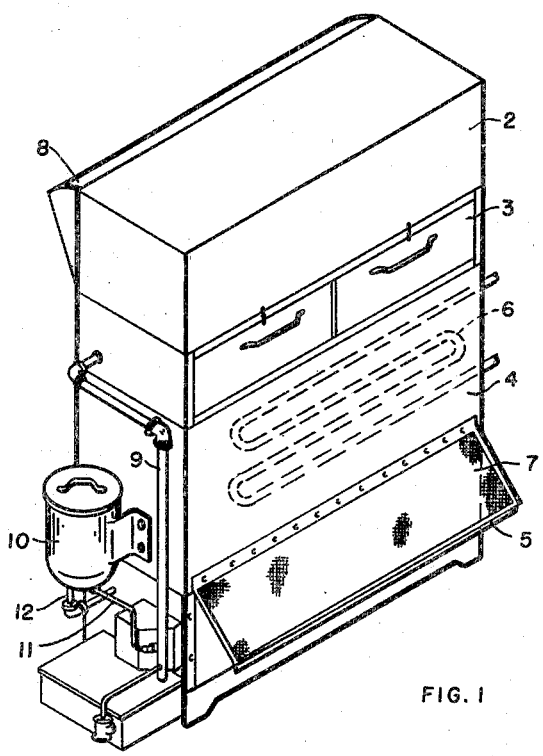
Figure 1 is an isometric view illustrating an evaporative condenser provided with the container of the present invention.

Referring to the drawings, there is shown in Figure 1 an evaporative condenser provided with the container of the present invention. The evaporative condenser includes a fan section 2, a spray nozzle section 3, a coil section 4 and a sump 5. A coil 6 is shown in dotted outline in section 4, coil 6 being connected as a portion of the usual refrigeration system (not shown). A fan draws air through inlet 7 into the casing of the condenser in heat exchange relation with refrigerant in coil 6, the air being discharged through outlet 8. Water is supplied to sump 5 and is circulated by means of a pump (not shown) to the spray nozzles of section 3, the water being discharged over coil 6 in heat exchange relation with refrigerant in the coil, water not evaporated falling again into sump 5. Line 9 connects the pump with the spray nozzles of section 3. The container 10 of the present invention is illustrated as mounted in any suitable manner on or adjacent the casing of the evaporative condenser. Container 10 is connected to line 9 by a bleed line 11 so that a portion of the water passing through line 9 is forwarded to container 10. Water leaves container 10 through line 12 and returns again to the sump.

Figure 2:
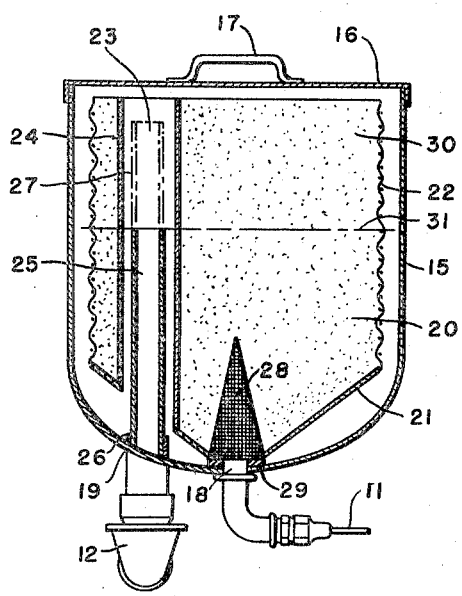
Figure 2 is a sectional view of the container of the present invention.

Container 10 is illustrated in section in Figure 2. Container 10 consists of a casing 15 having a cover 16 provided with a handle 17 to permit easy application and removal. An inlet 18 is provided in casing 15, inlet 18 being connected to line 11. Casing 15 has an outlet 19 connected to line 12.

A basket 20 is placed within casing 15. Basket 20 is provided with a solid metal base 21 in the form of a downwardly extending frustum of a cone. A perforated wall 22 extends upward in casing 15 from base 21, such wall preferably being formed of screening or any other suitable material adapted to permit water to pass therethrough while retaining solid matter within the basket. Basket 20 is provided with a standpipe opening 23 surrounded by a solid wall 24. A standpipe 25 extends upward in opening 23 and is connected by means of a nipple 26 to outlet 19. It will be observed that basket 20 is spaced from the wall of casing 15 and that standpipe 25 is spaced from the wall 24, for a purpose hereinafter described.

Standpipe 25 preferably is supplied in a length such that it extends almost to the top of casing 15. Since it is supplied in excessive length, the excessive length being shown by the dotted section 27, the standpipe is adjustable, for portions thereof may be removed to adjust the level of water in the container to a predetermined point. Thus, a continuous, predetermined rate of feed of water through the container and/or addition of substance to the water is provided in accordance with the type and size of the job on which the container is employed.

A cone-shaped member 28 is placed in basket 20 adjacent the inlet to prevent the anti-scaling substance closing or clogging the inlet thereby assuring entrance of water into basket 20 from the inlet. Member 28 may be formed of screening if desired although any suitable perforated member may be employed. A gasket 29 seals the space between basket 20 and inlet 18. The basket is filled with suitable anti-scaling substance as shown at 30.

Any desired anti-scaling substance may be employed. I have found a material known as "Micromet" is satisfactory. Such material is composed of a mixture of sodium hexametaphosphate and calcium phosphate and in the proportions roughly of 1–2. In this mixture, the calcium phosphate is added to control the solubility rate while the sodium hexametaphosphate aids in holding the calcium and magnesium salts in the water in suspension. The mixture of phosphates is fused and ground to desired particle size.

Considering the operation of the container, water enters the container through inlet 18 and passes through filter 28 into basket 20. Water rises to a predetermined level 31 as determined by the height of standpipe 25 within basket 20. Water passes from basket 20 through the perforated wall 22 into the space between the basket and the casing. The water, of course, then rises in opening 23 and overflows through standpipe 25. It will be noted that the portion of the substance below the level 31 may be considered a first or lower zone and the portion above level 31, a second or upper zone. It will be observed that a portion of the anti-scaling substance within the upper zone of the container never comes in contact with water in the basket. Thus, as the anti-scaling substance in the path of water flowing through the basket is dissolved, the supply is automatically renewed by gravity since dry substance falls to renew the supply of substance in the path of water flowing through the basket.

The present container satisfactorily treats water employed in an evaporative condenser to prevent formation of scale on the exterior of the tubes of the coil. It permits a considerably higher salts concentration in the water employed without scale formation on the coil of the condenser. To prevent an increase in salts concentration which would greatly increase the cost of water treatment, an overflow may be provided in the sump of the evaporator condenser thus permitting a minor portion of water in the sump to bleed off. As such water bleeds off, make-up water is continually added thereby diluting the water in the sump and maintaining the concentration of salts therein at a point which permits ready and inexpensive regulation. The amount of water, of course, permitted to bleed from the sump varies in accordance with the size of the evaporative condenser.

I provide an economical, simple container for an anti-scaling substance for addition to a liquid which provides a predetermined continuous rate of feed in accordance with the type and size of the job on which the container is employed. The rate of feed may be adjusted in accordance with the job thus permitting a standardized container to be employed for a variety of conditions.

An advantage of the present construction resides in the fact that the anti-scaling substance does not remain submerged in the liquid when operation of the evaporative condenser is discontinued since the liquid drains readily through the line to the pump, returning to the sump.

The present invention provides a simple and inexpensive means of water treatment of water employed in an evaporative condenser. Use of the container of the present invention greatly increases the time through which treatment may be provided without refilling the container for all the anti-scaling substance in the container is not in contact with water passing through the container, the supply of substance in contact with water being automatically renewed as it is dissolved. The container is inexpensive to manufacture and may be readily employed with existing equipment.

While I have described a preferred embodiment of my invention, it will be understood my invention is not limited thereto since it may be otherwise embodied within the scope of the following claims.

I claim:

1. In a container adapted to permit addition of dry particulate scale preventing matter to a liquid, the combination of a casing having an inlet and an outlet, a basket mounted in said casing and connected to the inlet, said basket having a perforated portion adapted to permit passage of liquid from the interior of the basket to the exterior thereof, said basket being provided with a vertical wall extending through the basket defining a passage therethrough, a member in said basket to prevent the dry matter closing the inlet, a standpipe connected to the outlet and extending in said passage intermediate the outlet and the top of the basket, and dry particulate scale preventing matter filling and extending beyond a first zone defined by the top of the standpipe and the bottom of the basket into a second zone superposed on said first zone, the dry matter in the second zone passing by gravity into the first zone to replace the material dissolved therefrom by the passage of liquid from the inlet of the casing through the basket.

2. In a container adapted to permit addition of dry particulate scale preventing matter to a liquid, the combination of a casing having an inlet and an outlet, a basket mounted in said casing and connected to the inlet, said basket having a base in the form of a frustrum of a cone spaced from the casing and perforated wall portion extending from the base, said basket being provided with a vertical wall extending through the basket defining a passage therethrough, a member in said basket to prevent the dry matter closing the inlet, a standpipe connected to the outlet and extending in said passage intermediate the outlet and the top of the basket, dry particulate scale preventing matter filling and extending beyond a first zone, defined by the top of the standpipe and the bottom of the basket, in the path of liquid directed into and from the basket and into a second zone superposed on said first zone, the dry matter in the second zone being adapted to pass by gravity into the first zone to replace the material dissolved therefrom by the passage of the liquid therethrough, whereby liquid passing through the member into the basket, then through the perforated wall of the basket, the liquid collecting in the base of the casing then flowing upward adjacent and exterior of the standpipe, overflowing into the standpipe and flowing to the casing outlet.

3. In combination with an evaporative condenser, a container for holding an anti-scaling substance for addition to liquid distributed over the coil of the condenser to prevent scale formation on the coil, said container comprising a casing having an inlet and an outlet, a basket mounted in said casing and connected to the inlet, said basket including a base portion and a perforated wall portion extending upwardly therefrom in spaced relation to the interior of the casing, said basket further including a vertical wall extending through the basket defining a passage having a lower opening in the base portion and an upper opening in communication with the top of the basket, a member in said basket to prevent said substance from closing the inlet, a standpipe connected to the outlet and extending upwardly into the passage intermediate the outlet and the top of the basket, and a quantity of anti-scaling substance filling and extending beyond a first zone defined by the top of the standpipe and the bottom of the basket into a second zone superposed on said first zone, the substance being adapted to pass by gravity into the first zone to replace the substance dissolved therefrom as liquid passes through the basket.

References Cited in the file of this patent

UNITED STATES PATENTS

| | | | |
|---|---|---|---|
| 847,729 | Clements et al. | | Mar. 19, 1907 |
| 976,665 | Ledoux | | Nov. 22, 1910 |
| 1,335,802 | Stewart | | Apr. 6, 1920 |
| 1,512,009 | Brower | | Oct. 14, 1924 |
| 2,162,809 | Groak et al. | | June 20, 1939 |
| 2,532,973 | Wallentin et al. | | Dec. 5, 1950 |
| 2,573,576 | Klumb | | Oct. 30, 1951 |

FOREIGN PATENTS

| | | | |
|---|---|---|---|
| 377,741 | France | | Sept. 13, 1907 |